(12) United States Patent
Kolb et al.

(10) Patent No.: US 10,738,214 B2
(45) Date of Patent: Aug. 11, 2020

(54) USE OF BLOCK COPOLYMERS IN COATINGS

(71) Applicant: Evonik Degussa GmbH, Essen (DE)

(72) Inventors: Nicolai Kolb, Recklinghausen (DE); Patrick Glöckner, Haltern am See (DE)

(73) Assignee: Evonik Operations GmbH, Essen (DE)

( * ) Notice: Subject to any disclaimer, the term of this patent is extended or adjusted under 35 U.S.C. 154(b) by 110 days.

(21) Appl. No.: 16/099,212

(22) PCT Filed: Feb. 3, 2017

(86) PCT No.: PCT/EP2017/052334
§ 371 (c)(1),
(2) Date: Nov. 6, 2018

(87) PCT Pub. No.: WO2017/194209
PCT Pub. Date: Nov. 16, 2017

(65) Prior Publication Data
US 2019/0153258 A1    May 23, 2019

(30) Foreign Application Priority Data
May 9, 2016   (EP) ..................................... 16168683

(51) Int. Cl.
*C09D 167/04*   (2006.01)
*C09D 177/12*   (2006.01)
*C09D 179/02*   (2006.01)

(52) U.S. Cl.
CPC ......... *C09D 167/04* (2013.01); *C09D 177/12* (2013.01); *C09D 179/02* (2013.01)

(58) Field of Classification Search
USPC ......................................... 428/480, 481, 482
See application file for complete search history.

(56) References Cited

U.S. PATENT DOCUMENTS 6,423,778 B1 *   7/2002   McGee ................ C09D 153/00
                                                                156/309.6
2003/0144454 A1   7/2003   Krebs

FOREIGN PATENT DOCUMENTS

DE    4416281 C1    11/1995
WO    0146330 A1    6/2001

* cited by examiner

*Primary Examiner* — Terressa Boykin
(74) *Attorney, Agent, or Firm* — Nexsen Pruet PLLC; Philip P. McCann

(57) ABSTRACT

The present invention relates to the use of block copolymers based on OH-, COOH- or amino-functionalized polyolefins and polyesters as binders in coating compositions, preferably paints, especially for improving the adhesion of coatings, especially coil coatings on metals, and to coating compositions comprising the block copolymers mentioned.

15 Claims, No Drawings

USE OF BLOCK COPOLYMERS IN COATINGS

FIELD

The present invention relates to the use of block copolymers based on OH-, COOH- or amino-functionalized polyolefins and polyesters as binders in coating compositions, preferably paints. More particularly, the invention relates to the use of the block copolymers mentioned for improving the adhesion of coatings, especially coil coatings, on metals, and to coating compositions comprising the block copolymers mentioned.

BACKGROUND

Polyester polyols and polyether polyols nowadays have many uses as raw materials, including for production of paint resins which are utilized, for example, for the preliminary coating of metals. For this purpose, the polyols are generally dissolved in solvents and, after application to the metal, crosslinked with melamine while heating, in the course of which the crosslinked polyester adheres to the metal and the solvent evaporates.

An essential factor for the adhesion is the nature of the substrate, i.e. generally the nature of the metal. In many cases, the metals are soiled owing to processing steps, for example by oil residues. Residues of this kind lead to a distinct reduction in adhesion and wetting of the paint system on the metal. For this reason, in the current standard processes, intensive cleaning of the metals is required before the actual coating with the paint system. This additional cleaning is generally very inconvenient and laborious.

The problem addressed was thus that of providing systems which get around the disadvantages of the prior art mentioned.

Said problem is solved through the use of block copolymers according to the present invention. The present invention accordingly firstly provides for the use of block copolymers formed from OH-, COOH- or amino-functionalized polymers and polyesters as binders in coating compositions, preferably paints, especially for improvement of the adhesion of coatings, especially coil coatings on metals.

The present invention accordingly firstly provides for the use of block copolymers formed from OH-, COOH- or amino-functionalized polymers and polyesters as binders in coating compositions, wherein the OH-, COOH- or amino-functionalized polymers are selected from $NH_2$- or NHR- or $NR_2$-functionalized polyamides, $NH_2$- or NHR- or $NR_2$-functionalized polyamines, OH- or COOH-functionalized polystyrene or OH- or COOH-functionalized polyolefins, where R is identical or different organic radicals, preferably aliphatic or aromatic radicals having preferably 1 to 20 and more preferably 1 to 6 carbon atoms.

SUMMARY

It has been found that, surprisingly, the disadvantages of the prior art, namely the low adhesion and poor wetting of polyester- and polyether-based paints on soiled, especially oily, surfaces can be improved by the incorporation of the block copolymers used in accordance with the invention. In this context, the inventive use of block copolymers formed from OH-, COOH- or amino-functionalized polymers and polyesters offers the advantage that the nonpolar units, for example polybutadiene, are rendered compatible by the block structure and are modifiable in any of a variety of ways by means of the polyester, for example in terms of molecular weight, thermal properties and solubility with respect to other polyesters. The effect of block copolymers formed from OH-, COOH- or amino-functionalized polymers and polyesters as adhesion promoter for improvement of the adhesion properties, especially on metallic substrates, is unknown to the person skilled in the art from the prior art, especially in the respect that even the mere addition of the block copolymers is sufficient for their effect to be displayed.

DETAILED DESCRIPTION

In general, the block copolymers used in accordance with the invention that are based on OH-, COOH- or amino-functionalized, preferably terminated, polymers and polyesters are $B(A)_x$ block systems with A=polyester, with B=OH-, COOH- or amino-functionalized, preferably terminated, polymer, preferably a polyolefin, and with $x \geq 1$, preferably $x > 1$. The value of x reflects the functionality of the OH-, COOH- or amino-functionalized, preferably terminated, polymer. In general, the functionality of the OH-, COOH- or amino-functionalized, preferably terminated, polymers and hence x is in the range from 1 to 5, preferably in the range from 1.5 to 3.5, especially preferably in the range from 2 to 3. In the case that x=2, i.e. in the case of OH-, COOH- or amino-functionalized, preferably terminated, polymers having a functionality of 2, the block copolymers are especially ABA triblock systems. In addition, block structures of the formula $(AB)_n$ are likewise possible, where $n \geq 1$. Preferred block copolymers used in accordance with the invention are those that are OH- or COOH-terminated.

In detail, the block copolymers used in accordance with the invention that are based on OH-, COOH- or amino-functionalized and preferably-terminated polymers and polyesters can be described as B'—(—Y-A'-X)$_x$ systems with A'=polyester radical, B'=polyolefin radical, Y=O, COO or NR groups with R as defined above, X=OH or COOH end groups, and with $x \geq 1$, preferably $x > 1$.

In principle, it is possible for any of the OH-, COOH- or amino-functionalized polymers known to the person skilled in the art from the group comprising $NH_2$- or NHR- or $NR_2$-functionalized polyamides, $NH_2$- or NHR- or $NR_2$-functionalized polyamines, OH- or COOH-functionalized polystyrene or OH- or COOH-functionalized polyolefins to be used as a basis for the block copolymers in the context of the present invention. In the context of the present invention, preference is given to the presence of terminal OH, COOH or amino groups for formation of the copolymers. Furthermore, in the preferred OH- or amino-terminated polymers, further OH, COOH or amino groups may be present along the chain.

Examples of suitable OH-, COOH- or amino-functionalized polymers are $NH_2$- or NHR- or $NR_2$-functionalized polyamides, $NH_2$- or NHR- or $NR_2$-functionalized polyamines, OH- or COOH-functionalized polystyrene, OH- or COOH-functionalized polyolefins such as OH- or COOH-functionalized polybutadiene, OH- or COOH-functionalized polyisoprene, OH- or COOH-functionalized polyethylene, OH- or COOH-functionalized polypropylene. Preferred OH- or COOH-functionalized polymers are OH- or COOH-terminated polymers, especially OH- or COOH-terminated polystyrene and OH- or COOH-terminated polyolefins, especially OH- or COOH-terminated polybutadiene. Most preferably, the OH- or amino-terminated polymer is OH- or COOH-terminated polybutadiene. Most preferably, the OH-, COOH- or amino-terminated polymer is OH-terminated polybutadiene.

In the context of the present invention, as stated at the outset, the OH-, COOH- or amino-functionalized polymers used for the preparation of the block copolymers used in accordance with the invention are especially preferably OH-terminated polybutadienes. These may be used in unhydrogenated form or else in partly or fully hydrogenated form.

In a particularly preferred embodiment of the present invention, the hydroxyl-terminated polybutadiene comprises the 1,3-butadiene-derived monomer units

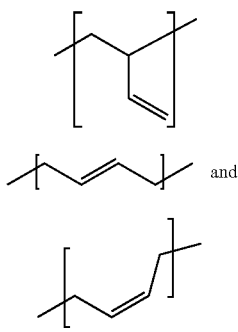

(I)

(II) and (III)

wherein the proportion of (I) in the entirety of the 1,3-butadiene-derived monomer units present in the polybutadiene is 10 to 60 mole percent, and wherein the sum total of the proportions of (II) and (III) in the entirety of the 1,3-butadiene-derived monomer units present in the polybutadiene is 40 to 90 mole percent.

The abovementioned hydroxyl-terminated polybutadiene is preferably a polybutadiene having hydroxyl groups produced by free-radical polymerization of 1,3-butadiene, in each case comprising the 1,3-butadiene-derived monomer units (I), (II) and (III) present in the polybutadiene, where a square bracket in the formula representation chosen in this application for the 1,3-butadiene-derived monomer units (I), (II) and (III) present in the polybutadiene shows that the bond marked with the respective square bracket does not end with a methyl group, for instance; instead, the relevant monomer unit is bonded via this bond to another monomer unit or a hydroxyl group. These monomer units (I), (II) and (III) may be arranged in the polymer in any desired sequence. A random arrangement is preferred.

In a preferred embodiment, the proportion of (I), (II) and (III) in the entirety of the 1,3-butadiene-derived monomer units present in the polybutadiene is in each case independently at least 10 mol %.

Especially preferably, the proportion of (I) in the entirety of the 1,3-butadiene-derived monomer units present in the polybutadiene is 15 to 30 mol %, the proportion of (II) in the entirety of the 1,3-butadiene-derived monomer units present in the polybutadiene is 50 to 70 mol % and the proportion of (III) in the entirety of the 1,3-butadiene-derived monomer units present in the polybutadiene is 15 to 30 mol %. The mean molecular weight, determined by gel permeation chromatography, of the hydroxyl-terminated polybutadienes is typically between 500 and 10 000 g/mol, preferably between 1000 and 5000 g/mol, more preferably between 1500 and 4000 g/mol.

In a preferred embodiment, in addition to the 1,3-butadiene-derived monomer units (I), (II) and (III) present in the polybutadiene, other monomer units may also be present, especially those that are not derived from 1,3-butadiene. In a preferred embodiment, however, the entirety of the 1,3-butadiene-derived monomer units (I), (II) and (III) present in the polybutadiene represents a proportion of the entirety of the monomer units incorporated in the polymer and comprising the 1,3-butadiene-derived units and other units of at least 80, preferably 90, more preferably 95 and most preferably 100 mole percent.

The hydroxyl-terminated polybutadienes used in accordance with the invention are prepared by means of free-radical polymerization, for example by polymerization of 1,3-butadiene in the presence of hydrogen peroxide, water and an organic solvent. Suitable processes are described, for example, in EP 2 492 292.

The polybutadienes usable with preference in the context of the present invention are commercially available, for example in the form of POLYVEST® HT from Evonik Resource Efficiency GmbH.

The functionality of the OH-terminated polybutadienes used is generally in the range from 1 to 5, preferably in the range from 1.5 to 3.5 and especially preferably in the range from 2 to 3.

An essential factor in the context of the present invention is the presence of OH groups for formation of the copolymers. These OH groups are typically present at the chain end of the polybutadiene; in addition, further OH groups may be present along the chain in the OH-terminated polybutadienes. Therefore, the functionality (calculated from the OH number and the number-average molecular weight) of the OH-terminated polybutadienes used is generally in the range from 1 to 5, preferably in the range from 1.5 to 3.5. In the context of the present invention, the functionality is determined by the correlation of molecular weight with OHN.

It is possible to adjust the functionality, for example by the reaction of monoisocyanates with the OH groups.

As well as the above-described OH-, COOH- or amino-functionalized polymers (block B), the block copolymers used in accordance with the invention contain blocks formed from polyesters (block A); more particularly, the block copolymers are based on polyesters formed from lactones and/or lactide and mixtures thereof.

Examples of suitable lactones are especially $C_3$ lactones such as β-propiolactone, $C_4$ lactones such as β-butyrolactone or γ-butyrolactone, $C_5$ lactones such as 4-hydroxy-3-pentenoic acid-gamma-lactone, α-methylene-γ-butyrolactone, γ-methylene-γ-butyrolactone, 3-methyl-2(5H)-furanone, γ-valerolactone, δ-valerolactone, $C_6$ lactones such as δ-hexalactone, ε-caprolactone or γ-hexalactone, or further lactones such as 5-butyl-4-methyldihydro-2(3H)-furanone, δ-octanolactone, γ-phenyl-ε-caprolactone, oxacyclododecan-2-one, oxacyclotridecan-2-one, pentadecanolide, 16-hexadecanolide, γ-undecalactone, δ-undecalactone, γ-methylene-γ-butyrolactone or mixtures thereof.

Lactides in the context of the present invention are understood to mean cyclic esters of lactic acid which can occur in three isomers: (S,S)-3,6-dimethyl-1,4-dioxane-2,5-dione (CAS No. 4511-42-6), (R,R)-3,6-dimethyl-1,4-dioxane-2,5-dione (CAS No. 25038-75-9) and (meso)-3,6-dimethyl-1,4-dioxane-2,5-dione (CAS No. 13076-19-2). No isomeric form is particularly preferred here.

Preferably, preparation of the block copolymers is accomplished using mixtures of at least two lactones and/or lactides, preferably mixtures of one lactone and one lactide, with especial preference for mixtures of epsilon-caprolactone and lactide. In this way, it is possible to vary the properties of the block copolymers in a controlled manner, especially with regard to miscibility with other polyester polyols or with regard to the thermal properties.

The block copolymers used in accordance with the invention, formed from OH-, COOH- or amino-functionalized polymers and polyesters, are especially obtained by OH-, COOH- or amino-initiated ring-opening polymerization. The OH-, COOH- or amino-functionalized polymers serve here as initiator in the ring opening of the lactones and/or lactides, which leads to the formation of the polyester chains on the OH-, COOH- or amino-functionalized polymer.

Standard homogeneous catalysts for the ring-opening polymerization are, for example, tin(II) ethylhexanoate, dibutyltin dilaurate, organic amidine bases such as 1,8-diazabicyclo[5.4.0]undec-7-ene, 1,5-diazabicyclo[4.3.0]non-5-ene, 1,4-diazabicyclo[2.2.2]octane and 1,5,7-triazabicyclo[4.4.0]dec-5-ene, or titanium(IV) alkoxides such as tetramethyl titanate, tetrabutyl titanate, tetraisopropyl titanate, tetraphenyl titanate, dibutyltriethanolamine titanate, tetrahexyl titanate or triethanolaminatoisopropyl titanate.

The ring-opening reaction is normally conducted at temperatures of 20-250° C., especially within a period of 0.1-20 hours, either in the melt or in the presence of solvents.

The molar ratios of lactone and/or lactide to OH-, COOH- or amino-containing polymers are typically 1:1 to 200:1.

The concentration of hydroxyl end groups in the block copolymers used in accordance with the invention, determined by titrimetric means to DIN 53240-2, is between 0 and 300 mg KOH/g, preferably between 5 and 50 mg KOH/g.

The concentration of acid end groups in the block copolymers used in accordance with the invention, determined to DIN EN ISO 2114, is between 0 and 50 mg KOH/g, but preferably below 2 mg KOH/g.

The number-average molecular weight of the block copolymers used in accordance with the invention is 600-60 000 g/mol, preferably 1000-30 000 g/mol. It is determined to DIN 55672-1 by means of gel permeation chromatography in tetrahydrofuran as eluent and polystyrene for calibration.

The functionality of the block copolymers used in accordance with the invention is generally in the range from 1 to 5, preferably in the range from 1.5 to 3.5. In the context of the present invention, the functionality is determined by the correlation of molecular weight with OHN.

The present invention further provides coating compositions at least comprising (a) block copolymers formed from OH-, COOH- or amino-functionalized polymers (block B) and polyesters (block A), and (b) at least one further OH-, COOH- or amino-functionalized component, especially OH- and/or COOH-functionalized polyesters, OH-functionalized polyethers, OH-functionalized polybutadiene (e.g. POLYVEST® HT), OH- and/or COOH-functionalized poly(meth)acrylates or amino-functionalized polymers.

In a preferred embodiment, the coating compositions comprise, as component (b), polyesters based on di- or polyols and di- or polycarboxylic acids or derivatives thereof.

With regard to the polyols and polycarboxylic acids, there are no restrictions in principle, and it is possible in principle for any mixing ratios to occur. The selection is guided by the desired physical properties of the polyester. At room temperature, these may be solid and amorphous, liquid and amorphous or/and (semi)crystalline.

Polycarboxylic acids are understood to mean compounds bearing more than one carboxyl group and preferably two or more carboxyl groups. In a departure from the general definition, in particular embodiments, these are also understood to mean monocarboxylic acids. In the context of the present invention, carboxyl functionalities are also understood to mean derivatives thereof, for example esters or anhydrides.

The polycarboxylic acids may especially be aromatic or saturated or unsaturated aliphatic or saturated or unsaturated cycloaliphatic di- or polycarboxylic acids. Preference is given to using bifunctional dicarboxylic acids.

Examples of suitable aromatic di- or polycarboxylic acids and derivatives thereof are compounds such as dimethyl terephthalate, terephthalic acid, isophthalic acid, naphthalenedicarboxylic acid and phthalic anhydride.

Examples of linear aliphatic dicarboxylic or polycarboxylic acids include oxalic acid, dimethyl oxalate, malonic acid, dimethyl malonate, succinic acid, dimethyl succinate, glutaric acid, dimethyl glutarate, 3,3-dimethylglutaric acid, adipic acid, dimethyl adipate, pimelic acid, suberic acid, azelaic acid, dimethyl azelate, sebacic acid, dimethyl sebacate, undecanedicarboxylic acid, decane-1,10-dioic acid, dodecane-1,12-dioic acid, brassylic acid, tetradecane-1,14-dioic acid, hexadecane-1,16-dioic acid, octadecane-1,18-dioic acid, dimer fatty acids and mixtures thereof.

Examples of unsaturated linear di- and/or polycarboxylic acids include itaconic acid, fumaric acid, maleic acid or maleic anhydride.

Examples of saturated cycloaliphatic di- and/or polycarboxylic acids include derivatives of cyclohexane-1,4-dicarboxylic acids, cyclohexane-1,3-dicarboxylic acids and cyclohexane-1,2-dicarboxylic acids.

It is possible in principle to use any desired polyols for the preparation of the polyesters. Polyols are understood to mean compounds bearing more than one hydroxyl group and preferably two or more hydroxyl groups. In a departure from the general definition, in particular embodiments, these are also understood to mean monocarboxylic acids. For instance, linear or branched aliphatic and/or cycloaliphatic and/or aromatic polyols may be present.

Examples of suitable diols or polyols are ethylene glycol, propane-1,2-diol, propane-1,3-diol, butane-1,4-diol, butane-1,3-diol, butane-1,2-diol, butane-2,3-diol, pentane-1,5-diol, hexane-1,6-diol, octane-1,8-diol, nonane-1,9-diol, dodecane-1,12-diol, neopentyl glycol, butylethylpropane-1,3-diol, methylpropane-1,3-diol, methylpentanediols, cyclohexanedimethanols, tricyclo[2.2.1]decanedimethanol, isomers of limonenedimethanol, isosorbitol, trimethylolpropane, glycerol, 1,2,6-hexanetriol, pentaerythritol, polyethylene glycol, polypropylene glycol and mixtures thereof. Aromatic diols or polyols are understood to mean reaction products of aromatic polyhydroxyl compounds, for example hydroquinone, bisphenol A, bisphenol F, dihydroxynaphthalene etc., with epoxides, for example ethylene oxide or propylene oxide. Diols or polyols present may also be ether diols, i.e. oligomers or polymers based, for example, on ethylene glycol, propylene glycol or butane-1,4-diol. Preference is given to using bifunctional diols and dicarboxylic acids.

Polyols or polycarboxylic acids having more than two functional groups may be used as well, such as trimellitic anhydride, trimethylolpropane, pentaerythritol or glycerol, for example. Moreover, lactones and hydroxycarboxylic acids may be used as constituents of the polyester.

In particular embodiments, it is also possible to use monocarboxylic acids and monoalcohols, for example monofunctional fatty acids or fatty alcohols, as a constituent of the polyester.

The polyesters are preferably synthesized via a melt condensation. For this purpose, the aforementioned di- or polycarboxylic acids and di- or polyols are initially charged and melted in an equivalents ratio of hydroxyl to carboxyl groups of 0.5 to 1.5, preferably 1.0 to 1.3. The polycondensation takes place in the melt at temperatures between 150 and 280° C. over the course of 3 to 30 hours. In the course of this, a majority of the amount of water released is first distilled off at standard pressure. In the further course, the remaining water of reaction, and also volatile diols, are eliminated, until the target molecular weight is achieved. Optionally this may be made easier through reduced pressure, through an enlargement in the surface area, or by the passing of an inert gas stream through the reaction mixture. The reaction can additionally be accelerated by addition of an azeotrope former and/or of a catalyst, before or during the reaction. Examples of suitable azeotrope formers are toluene and xylenes. Typical catalysts are organotitanium or organotin compounds such as tetrabutyl titanate or dibutyltin oxide. Also conceivable are catalysts based on other metals, such as zinc or antimony, for example, and also metal-free esterification catalysts. Also possible are further additives and process aids such as antioxidants or colour stabilizers.

The polyesters (b) used in the coating compositions according to the invention preferably have an acid number, determined to DIN EN ISO 2114, between 0 and 50 mg KOH/g, preferably 0 to 30 mg KOH/g, more particularly 0 to 10 mg KOH/g. The acid number (AN) is understood to mean the amount of potassium hydroxide in mg needed to neutralize the acids present in one gram of solid. The sample for analysis is dissolved in dichloromethane and titrated with 0.1 N ethanolic potassium hydroxide solution using phenolphthalein.

The polyesters (b) used in the coating compositions according to the invention preferably have an OH number between 1 to 120 mg KOH/g, more preferably between 5 and 50 mg KOH/g. For the purposes of the present invention, the OH numbers are determined according to DIN 53240-2. With this method, the sample is reacted with acetic anhydride in the presence of 4-dimethylaminopyridine as catalyst, with the hydroxyl groups being acetylated. This forms one molecule of acetic acid per hydroxyl group while the subsequent hydrolysis of the excess acetic anhydride yields two molecules of acetic acid. The consumption of acetic acid is determined by titrimetry from the difference between the main value and a blank value, which is to be carried out in parallel.

The glass transition temperature of the polyesters (b) is in the range from −50° C. to 120° C., preferably between 10° C. and 70° C.

The number-average molecular weights Mn are in the range from 1000 to 25 000 g/mol, preferably 2000 to 10 000 g/mol.

The molecular weight for the purposes of the present invention is determined by means of gel permeation chromatography (GPC). The samples were characterized in tetrahydrofuran eluent in accordance with DIN 55672-1.

Mn (UV)=number-average molar weight (GPC, UV detection), report in g/mol

Mw (UV)=mass-average molar weight (GPC, UV detection), report in g/mol.

In addition, the polyesters (b) especially have a linear or branched structure, and are preferably lightly branched.

The polyesters used in accordance with the invention are prepared by known methods (see Dr. P. Oldring, Resins for Surface Coatings, Volume III, published by Sita Technology, 203 Gardiness House, Bromhill Road, London SW18 4JQ, England 1987), by (semi)continuous or batchwise esterification of the starting acids and starting alcohols in a single-stage or multi-stage regime.

The polyesters (b) are preferably synthesized via a melt condensation. For this purpose, the aforementioned di- or polycarboxylic acids and di- or polyols are initially charged and melted in an equivalents ratio of hydroxyl to carboxyl groups of 0.5 to 1.5, preferably 1.0 to 1.3. The polycondensation takes place in the melt at temperatures between 150 and 280° C. over the course of 3 to 30 h. In the course of this, a majority of the amount of water released is first distilled off at standard pressure. In the further course, the remaining water of reaction, and also volatile diols, are eliminated, until the target molecular weight is achieved. Optionally this may be made easier through reduced pressure, through an enlargement in the surface area, or by the passing of an inert gas stream through the reaction mixture. The reaction can additionally be accelerated by addition of an azeotrope former and/or of a catalyst, before or during the reaction. Examples of suitable azeotrope formers are toluene and xylenes. Typical catalysts are organotitanium or organotin compounds such as tetrabutyl titanate or dibutyltin oxide. Also conceivable are catalysts based on other metals, such as zinc or antimony, for example, and also metal-free esterification catalysts. Also possible are further additives and process aids such as antioxidants or colour stabilizers.

The proportion of the block copolymers used in accordance with the invention, formed from OH-, COOH- or amino-functionalized polymers (block B) and polyesters (block A) in the formulation is, based on the overall formulation, 0.1-99 percent by weight, preferably 10-50 percent by weight and more preferably 2-20 percent by weight, most preferably 3-10 percent by weight.

Polyesters (b) used with preference are, for example, the commercially available polyesters from the DYNAPOL® product group (from Evonik Resource Efficiency GmbH). Polyesters of this kind in many cases have a lightly branched structure, with different molecular weights and glass transition temperatures within the aforementioned ranges, and generally show optimal compatibility with other formulation constituents.

In addition, the coating compositions comprise crosslinking components that are known to the person skilled in the art from the prior art and are required for the desired crosslinking.

As well as the coating compositions already described, the present invention also provides methods of coating substrates.

In the method according to the invention for coating of a substrate, the substrate is coated with a coating composition according to the invention as described above, and the coating is subsequently dried and/or calcined. In the course of these operations, the formulation constituents undergo crosslinking to form the coating according to the invention.

In relation to the method for the coating of substrates with the coating compositions according to the invention there are a number of embodiments. In the simplest embodiment, coating takes place directly onto the substrate. Used for this purpose in particular is a method in which the formulation of the invention in organic solution, together with further formulation constituents, is applied as an "organosol" to the substrate, and the layer applied is subsequently dried. Coating here takes place for example by means of knife coating, roll coating, dip coating, curtain coating or spray coating. Crosslinking of the coating takes place in parallel with the drying operation.

In one particularly preferred, though not exclusive, variant of the stated coating variant of the present invention, the formulations according to the invention are used as part of coil coating procedures, also referred to as strip coating. Coil coating is a method for the single-sided or double-sided coating of flat strips—"coils"—of steel or aluminium, for example. The resulting material is a composite comprising a metallic support material, optionally pretreated and/or provided with an anti-corrosion primer, and of an organic coating. Methods and embodiments of coil coating procedures are known to the skilled person.

In a second embodiment, the coating is realized in the form of a surface coating sheet, furnished with the coating composition according to the invention, onto the respective substrate material. In this case, the first step is the firmly adhering coating of the coating composition according to the invention onto a corresponding sheet substrate material. The application of this surface coating sheet to the respective end substrate material is the next step. Here, the underside of the surface coating sheet is either coated with a self-adhesive formulation or furnished with a hotmelt or with an adhesive layer. This modification of the underside attaches to the end substrate material in temperature-assisted and pressure-assisted application.

In this way, further product features, including those of optical kind, for example, can be realized via the physical properties of the surface coating sheet. A method of this kind, moreover, is very flexible—for example, in the case of relatively large substrates to be coated, it can be employed in situ without handling of solvents or high temperatures.

In a third variant, similar to the second embodiment, the coating is realized in the form of a thermal transfer procedure of the coating composition according to the invention onto the respective substrate material.

In this case a corresponding film or paper support material is furnished in a first coating step with a release layer, which allows the inventive coating formulation, applied in a second coating step, to undergo thermal transfer onto the respective substrate material. Optionally here, if necessary, it is possible in a third coating step to apply an adhesive layer, which ensures proper adhesion of the thermal transfer layer construction on the respective substrate material.

A fourth embodiment represents solvent-free powder coating. Suitable methods and embodiments in this context are well known to the skilled person.

In a further embodiment of the present invention, the formulations according to the invention are used for production of coil laminates. Corresponding systems and embodiments are known in principle to those skilled in the art.

Optionally, the coating according to the invention may subsequently be provided with one or more further functional layers. The layers in question may comprise, for example, a scratch-resistant coating, a conductive layer, an anti-soiling coating and/or a reflection-enhancing layer or other layers with optical function. These additional layers may be applied, for example, by means of physical vapour deposition (PVD) or chemical vapour deposition (CVD).

An additional scratch-resistant coating may optionally be applied for further improvement in the scratch resistance. Scratch-resistant coatings may be, for example, silicon oxide layers, applied directly by means of PVD or CVD.

Surprisingly, the coating compositions according to the invention are suitable for use on oily surfaces.

In a preferred embodiment, the substrates in accordance with the invention are oily substrates. Oily substrates are understood to mean those substrates which contain natural, synthetic or mineral oils on the surface. The oily substances may get onto the substrates as a result of processing steps (e.g. drawing greases, separating agents, etc.). Especially in the coil-coating sector, the metallic surfaces are frequently contaminated with oily substances. Suitable metallic substrates are especially selected from steel and aluminium.

Even without further intimations, it is assumed that a skilled person will be able to utilize the above description to its widest extent. The preferred embodiments and examples are therefore to be interpreted merely as a descriptive disclosure which is by no means limiting in any way whatsoever. The present invention is elucidated in more detail below using examples. Alternative embodiments of the present invention are obtainable analogously.

EXAMPLES

Synthesis Example for Preparation of Block Copolymer P1

225 g of POLYVEST® HT were blended with 262.5 g of ε-caprolactone, 262.5 g of lactide and 0.75 g of a titanium catalyst under a nitrogen stream in a 1 l multineck flask with a reflux condenser. Subsequently, the mixture was heated under a constant nitrogen stream to 160° C. for 6 hours. The GPC analysis of the block copolymer gives a mean molecular weight $M_n$ of 6300 g/mol with a PDI of 3.3; the DSC analysis gives glass transition temperatures of −82° C. and −30° C. The OHN of the polymer is 19 mg KOH/g of polymer.

The process is modifiable with regard to the catalyst, the ratio of POLYVEST HT to lactone, and the lactone used.
Production of the Coating Compositions:

The coating compositions are produced by intensive mixing of the components at temperatures of 20° C. to 80° C. ("Lehrbuch der Lacktechnologie" [Textbook of Paint Technology], Th. Brock, M. Groteklaes, P. Mischke, ed.: V. Zorll, Vincentz Verlag, Hannover, 1998, p 229 ff). Non-liquid components are first brought in solution in suitable solvents, then the rest of the components are added while stirring.

For the production of the coating compositions, the polyols according to Table 1 were first dissolved in a 93:7 mixture of Solvent Naphtha 150:xylene, such that 65% by weight solutions were obtained.

TABLE 1

| Polymer composition of the polyol solutions Ratio of the polyol components (% by weight) | | | |
|---|---|---|---|
| Polyol | Solution I | Solution II | Solution III |
| DYNAPOL LH-898 | 100 | 95 | 95 |
| POLYVEST HT | 0 | 5 | 0 |
| P1 | 0 | 0 | 5 |

TABLE 2

| Formulation of the coating compositions | |
|---|---|
| Polyol solution (according to Table 1) | 64.0 g |
| Cymel303LF (from Allnex) | 10.4 g |
| Disparlon L1984 (50% in SN200ND) (from Kusomoto) | 1.5 g |
| DYNAPOL Catalyst 1203 (from Evonik) | 2.9 g |
| Resiflow FL2 (10% in Solvent naphtha 150ND) (from Worlee) | 2.6 g |
| Byk-057 (from BYK) | 0.6 g |
| DBE | 5.7 g |

TABLE 2-continued

Formulation of the coating compositions

| | |
|---|---|
| Xylene | 5.3 g |
| n-Butanol | 7.0 g |
| Total: | 100.0 g |

The coating compositions were applied to the metal substrates with a 32 μm coating bar and baked at 295° C. for 30 seconds. The metal substrates were aluminium having the dimensions 0.570×204.5×285.0 mm (depth×width×height) from Novelis (Göttingen). The metal substrates were surface-treated with Alodine 1200 according to DIN 50939 (corrosion protection, yellow chromatization).

To test the oil uptake, the surface of the metal substrates was contaminated beforehand with an example oil (10 W-40 motor oil) in a defined amount of 0.2 g/m².

TABLE 3

| | Coating composition | | | |
|---|---|---|---|---|
| | Comparative 1 & 2 | Comparative 3 | Example 1 | |
| | Polyol solution | | | |
| Test | Solution I | Solution I | Solution II | Solution III |
| Oil contamination (g/m²) | 0.0 | 0.2 | 0.2 | 0.2 |
| Substrate wetting (assessed visually, before and after baking) | Good, fully homogeneous | Poor, formation of droplets | Good, fully homogeneous | Good, fully homogeneous |
| MEK test[1] | 100 TS | 80 TS | 10 TS | 100 TS |

[1]ECCA Test Method T11: (This test method enables testing of the crosslinking of a reactive paint system under the underlying baking conditions.

Procedure: The coated metal sheet, consisting of aluminium or galvanized steel or the like, is subjected to chemical contamination/mechanical stress with a cotton bud soaked in methyl ethyl ketone (MEK) (with a 1 or 2 kg weight (MEK hammer)). This involves linear twin strokes, where there should be chemical attack on the coating. In general, a fully cured coating should withstand 100 twin strokes (TS) without damage. In the case of inadequate through-curing, there is dissolution of the paint after the first twin strokes, or possibly only later (<100 TS). The number of twin strokes correspondingly attained is stated as an integer and is a measure, for example, of the through-curing or crosslinking density or reactivity of a paint system.)

It is clearly apparent that the contamination of the metal surface with 0.2 g/m² of the example oil is sufficient to bring about inadequate wetting in the case of a pure polyester system. It has been found that this inadequate effect can be counteracted by the addition of small amounts of OH-terminated polybutadiene (POLYVEST HT), but the MEK test shows that inadequate crosslinking was obtained in the case of this formulation. In the case of addition of the block copolymers according to the invention, it was surprisingly found that there is still good wetting of the substrate, but with adequate crosslinking.

The invention claimed is:

1. A coating composition formed from OH-, COOH- or amino-functionalized polymers and polyesters as binders in coating compositions, wherein the block copolymers used in accordance with the invention that are based on OH-, COOH- or amino-functionalized polymers, polyesters are B(A)$_x$ block systems with A=polyester, with B=OH-, COOH- or amino-functionalized polymer and wherein x is from 1 to 5, and hydroxyl-terminated polybutadiene comprising 1,3-butadiene-derived monomer units from 15 to 30 mol % of

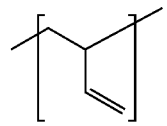

from 50 to 70 mol % of

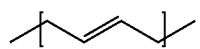

and from 15 to 30 mol % of

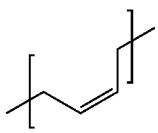

wherein the sum total of the proportions of (II) and (III) in the entirety of the 1,3-butadiene-derived monomer units present in the polybutadiene is 40 to 90 mole percent, and wherein the entirety of the 1,3-butadiene-derived monomer units (I), (II) and (III) present in the polybutadiene represents a proportion of the entirety of the monomer units incorporated in the polymer and comprising the 1,3-butadiene-derived units and other units of at least 80 mole percent.

2. The coating composition according to claim 1, wherein the block copolymers are based on polyesters formed from lactones and/or lactides, and wherein the entirety of the 1,3-butadiene-derived monomer units (I), (II) and (III) present in the polybutadiene represents a proportion of the entirety of the monomer units incorporated in the polymer and comprising the 1,3-butadiene-derived units and other units of at least 90 mole percent.

3. A coating composition comprising (a) block copolymers formed from OH-, COOH- or amino-functionalized polymers (block B) and polyesters (block A), and (b) a further OH-, COOH- or amino-functionalized component, wherein the OH-, COOH- or amino-functionalized polymers are selected from the group consisting of hydroxyl-terminated polybutadiene comprising 1,3-butadiene-derived monomer units from 15 to 30 mol % of

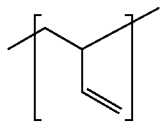
(I)

from 50 to 70 mol % of

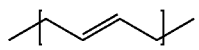
(II)

and
from 15 to 30 mol % of

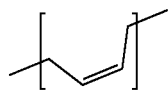
(III)

wherein the sum total of the proportions of (II) and (III) in the entirety of the 1,3-butadiene-derived monomer units present in the polybutadiene is 40 to 90 mole percent, and wherein the entirety of the 1,3-butadiene-derived monomer units (I), (II) and (III) present in the polybutadiene represents a proportion of the entirety of the monomer units incorporated in the polymer and comprising the 1,3-butadiene-derived units and other units of at least 80 mole percent.

4. The coating composition according to claim 3, wherein the coating composition is a paint for coil coatings on metals.

5. The coating composition according to claim 3, wherein the coating composition comprise, as component (b), polyesters based on di- or polyols and di- or polycarboxylic acids or derivatives thereof, and wherein the entirety of the 1,3-butadiene-derived monomer units (I), (II) and (III) present in the polybutadiene represents a proportion of the entirety of the monomer units incorporated in the polymer and comprising the 1,3-butadiene-derived units and other units of at least 90 mole percent.

6. A composition comprising a substrate and a coating compositions according to claim 3.

7. The composition according to claim 6, wherein the substrates are oily substrates.

8. The composition comprising a substrate and a coating compositions according to claim 4.

9. The composition comprising a substrate and a coating compositions according to claim 5.

10. The coating composition according to claim 2, wherein the block copolymers are based on polyesters formed from lactones and/or lactides.

11. The coating composition according to claim 4, wherein the coating composition comprise, as component (b), polyesters based on di- or polyols and di- or polycarboxylic acids or derivatives thereof.

12. The coating composition according to claim 1, wherein the entirety of the 1,3-butadiene-derived monomer units (I), (II) and (III) present in the polybutadiene represents a proportion of the entirety of the monomer units incorporated in the polymer and comprising the 1,3-butadiene-derived units and other units of at least 95 mole percent.

13. The coating composition according to claim 1, wherein the entirety of the 1,3-butadiene-derived monomer units (I), (II) and (III) present in the polybutadiene represents a proportion of the entirety of the monomer units incorporated in the polymer and comprising the 1,3-butadiene-derived units and other units of 100 mole percent.

14. The coating composition according to claim 3, wherein the entirety of the 1,3-butadiene-derived monomer units (I), (II) and (III) present in the polybutadiene represents a proportion of the entirety of the monomer units incorporated in the polymer and comprising the 1,3-butadiene-derived units and other units of at least 95 mole percent.

15. The coating composition according to claim 3, wherein the entirety of the 1,3-butadiene-derived monomer units (I), (II) and (III) present in the polybutadiene represents a proportion of the entirety of the monomer units incorporated in the polymer and comprising the 1,3-butadiene-derived units and other units of 100 mole percent.

* * * * *